United States Patent [19]
Terui et al.

[11] Patent Number: 5,710,813
[45] Date of Patent: Jan. 20, 1998

[54] DIGITAL VOICE RECORDING/ REPRODUCING APPARATUS

[75] Inventors: Nobuo Terui; Hidetaka Takahashi, both of Hachioji, Japan

[73] Assignee: Olympus Optical Co., Ltd., Tokyo, Japan

[21] Appl. No.: 412,131

[22] Filed: Mar. 28, 1995

[51] Int. Cl.⁶ ........................................ H04L 9/00
[52] U.S. Cl. .................. 380/4; 380/3; 360/60; 395/2.82
[58] Field of Search ................ 360/60; 369/34; 380/3, 4, 9, 49, 50; 395/2.87, 2.79, 2.1, 2.81, 2.82, 2.83

[56] References Cited

U.S. PATENT DOCUMENTS

| | | | |
|---|---|---|---|
| 4,440,976 | 4/1984 | Bocci et al. | 380/1 |
| 4,458,315 | 7/1984 | Uchenick | 380/4 |
| 4,670,857 | 6/1987 | Rackman | 380/4 |
| 4,866,769 | 9/1989 | Karp | 380/4 |
| 5,136,648 | 8/1992 | Olsen et al. | 380/50 |
| 5,155,768 | 10/1992 | Matsuhara | 380/23 |
| 5,231,546 | 7/1993 | Shimada | 360/60 |
| 5,237,609 | 8/1993 | Kimura | 380/3 |
| 5,359,698 | 10/1994 | Goldberg | 395/2.1 |
| 5,379,433 | 1/1995 | Yamagishi | 380/4 X |
| 5,460,374 | 10/1995 | Owaki | 380/3 X |
| 5,491,774 | 2/1996 | Norris et al. | 395/2.79 |

FOREIGN PATENT DOCUMENTS

| | | | |
|---|---|---|---|
| 0464320 A2 | 1/1992 | European Pat. Off. | G06F 1/00 |
| 0593305 A2 | 4/1994 | European Pat. Off. | G11B 23/28 |
| 4207447 A1 | 9/1993 | Germany | G10L 5/04 |
| 63-90098 | 4/1988 | Japan . | |

*Primary Examiner*—Gilberto Barrón, Jr.
*Assistant Examiner*—Pinchus M. Laufer
*Attorney, Agent, or Firm*—Frishauf, Holtz, Goodman, Langer & Chick

[57] ABSTRACT

A digital voice recording/reproducing apparatus comprises a user identification code memory, provided in a main body, for storing a predetermined user identification code in advance before the apparatus is shipped from a factory, a voice cartridge attaching section for attaching a detachable voice cartridge having a semiconductor memory to the main body, and a user identification code writing section for writing the user identification code stored in the user identification code memory in advance to the semiconductor memory of the voice cartridge attached to the main body.

9 Claims, 7 Drawing Sheets

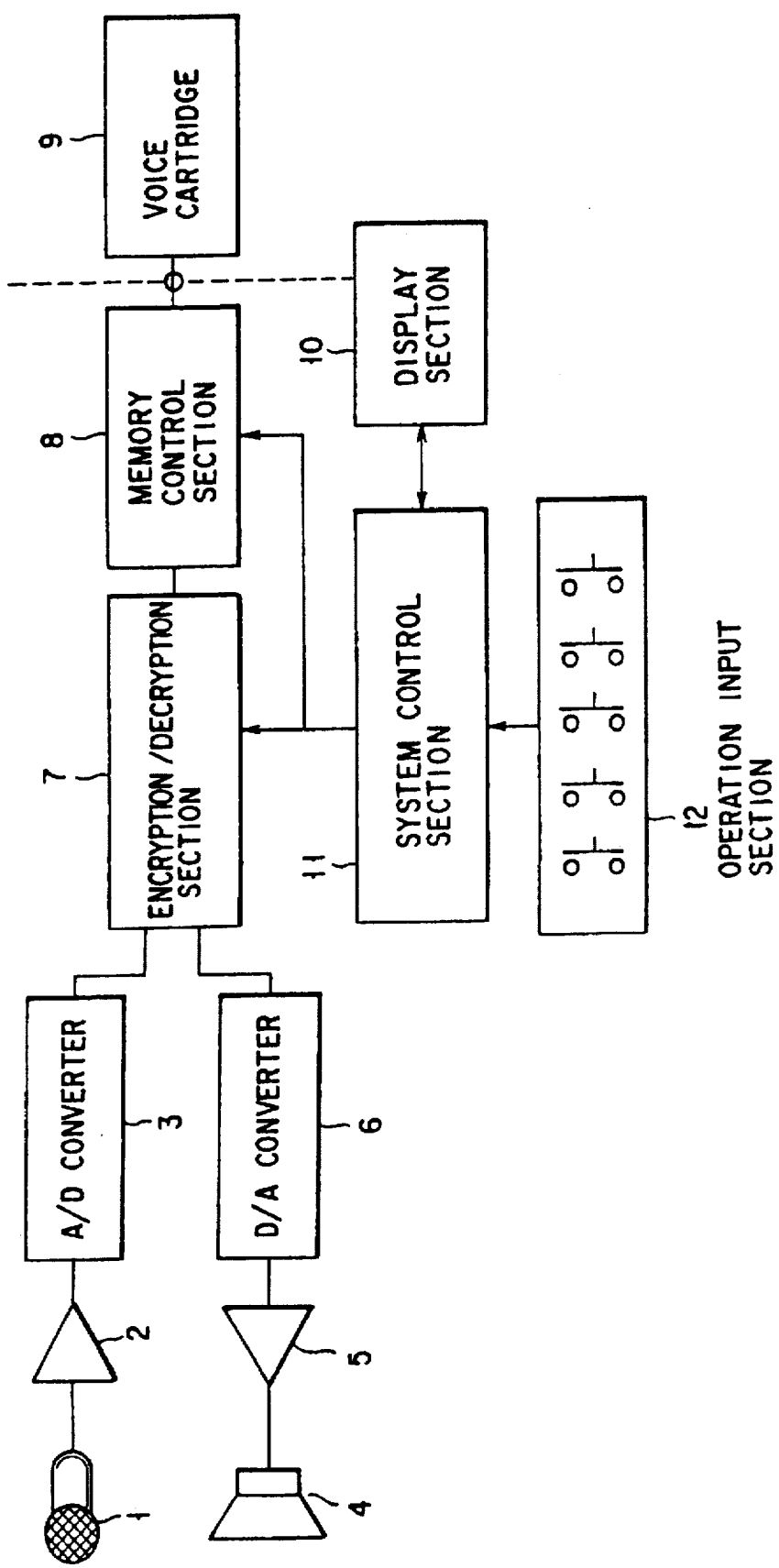
F I G. 1

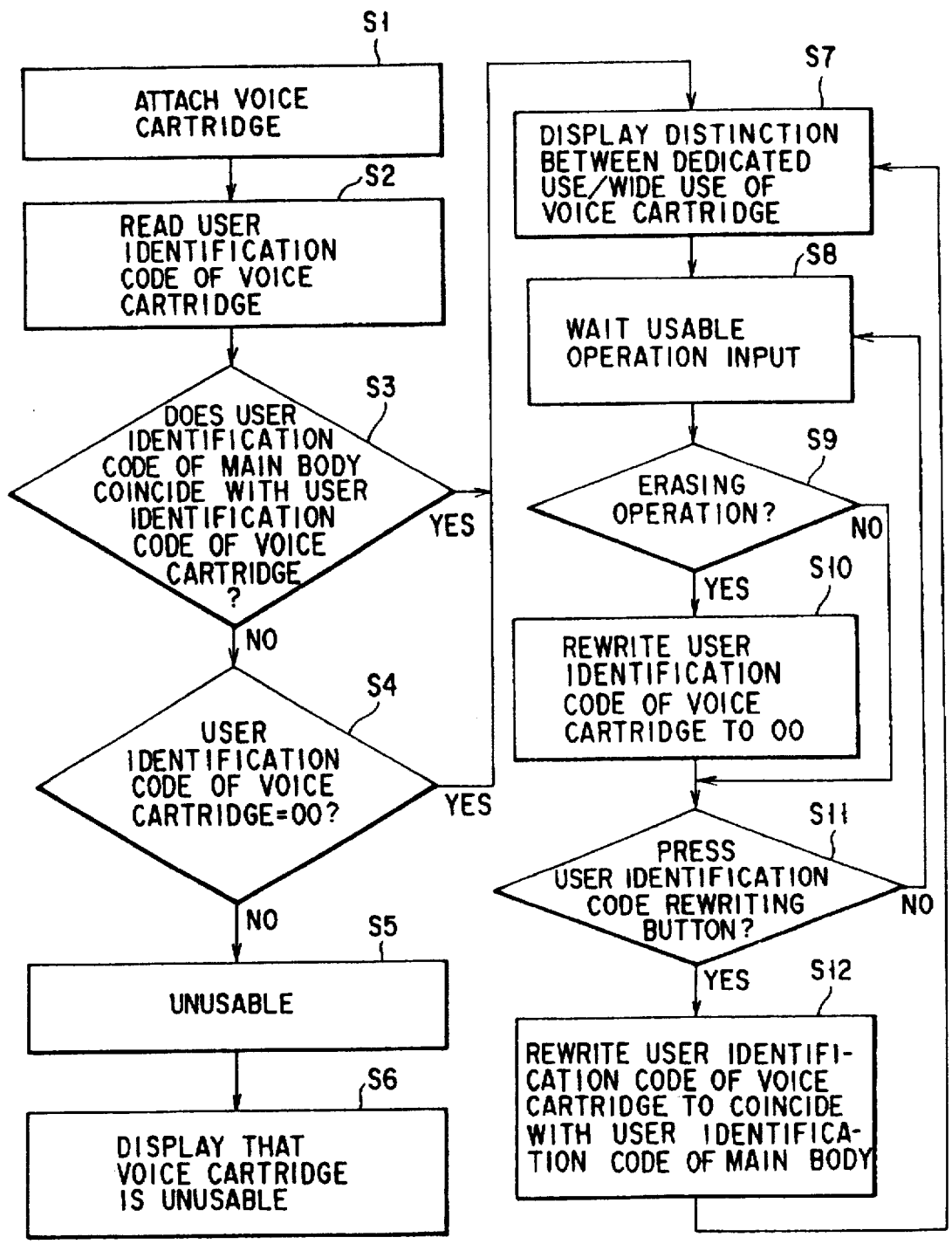
F I G. 4

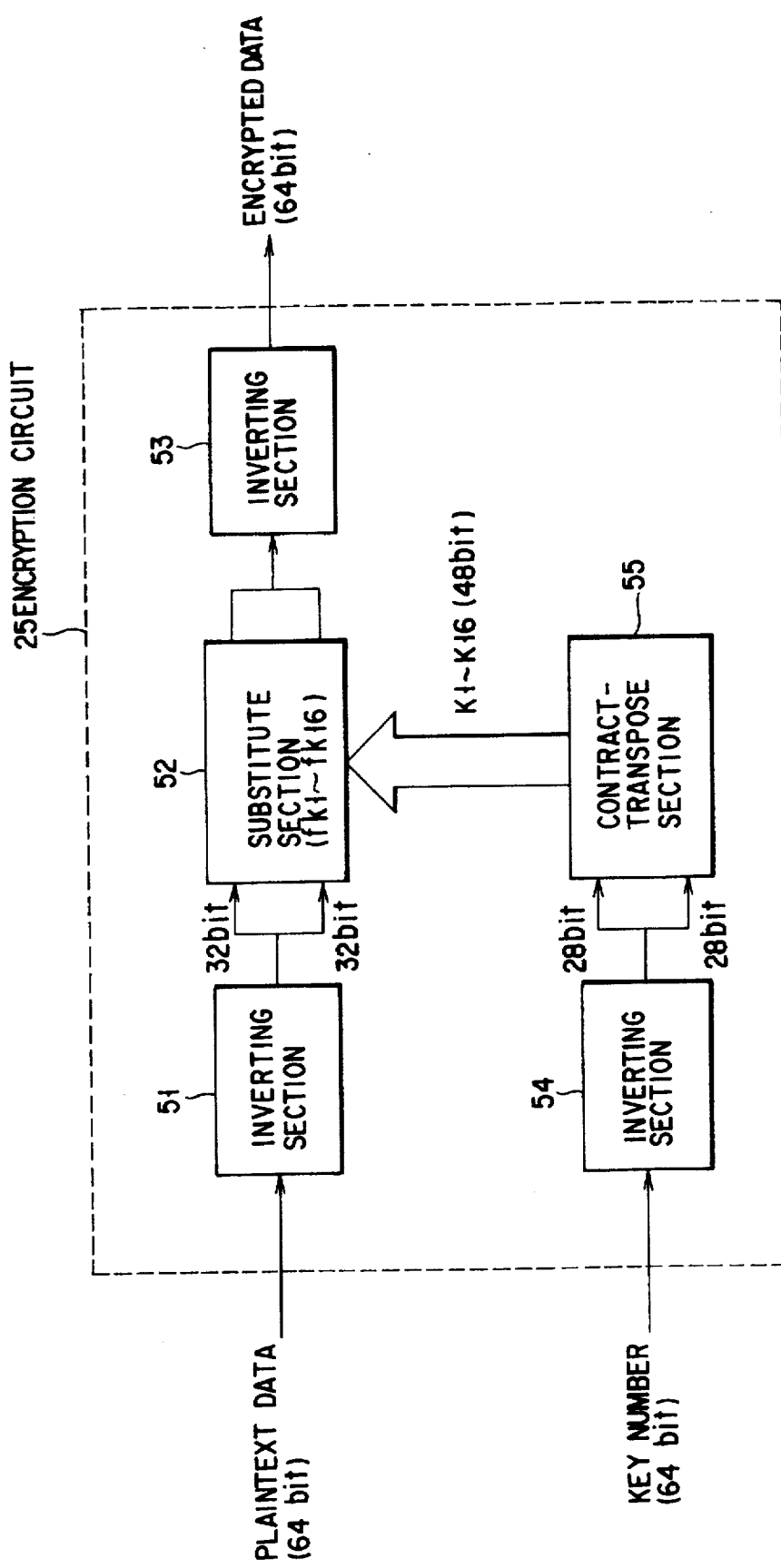
F I G. 7

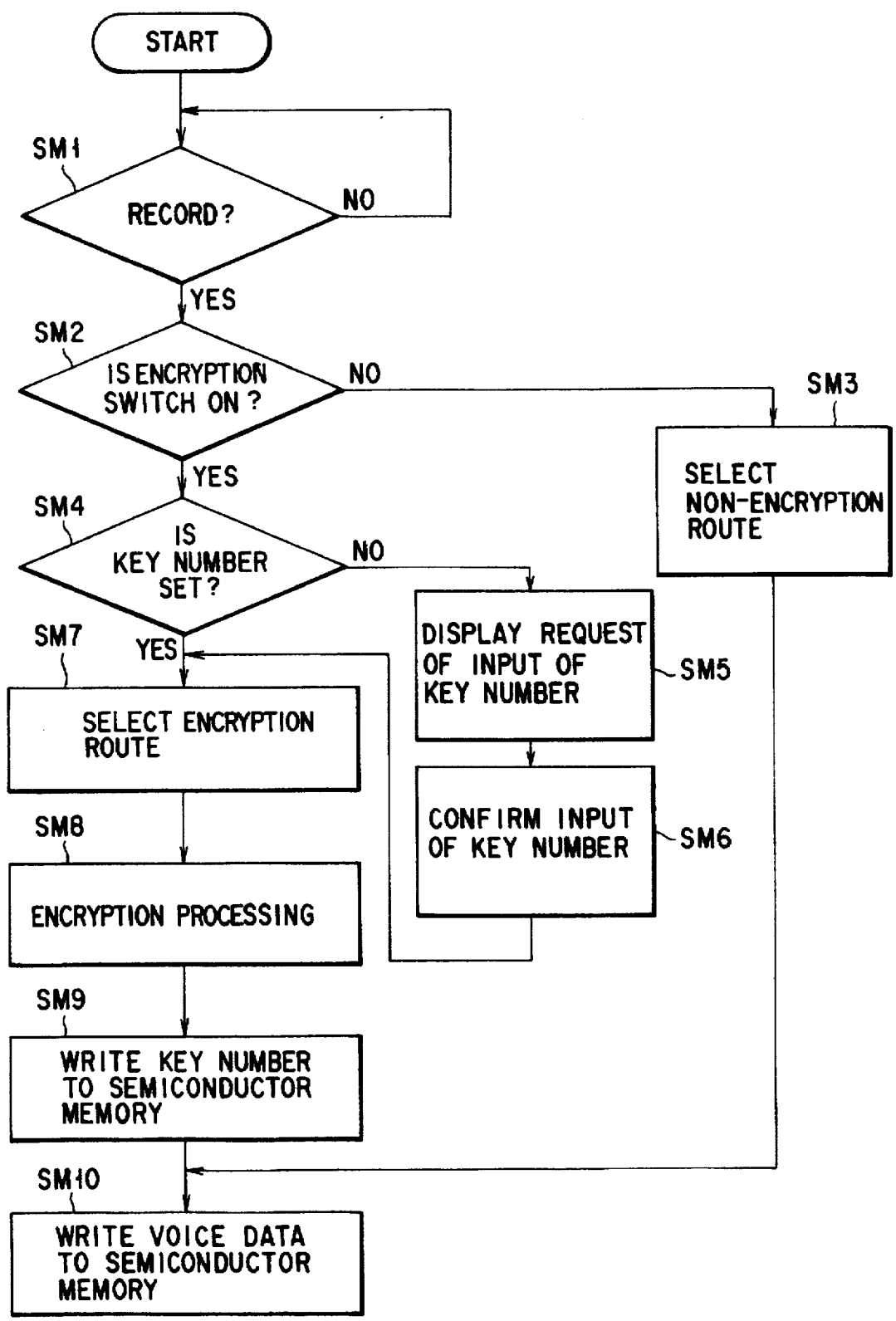
F I G. 8

DIGITAL VOICE RECORDING/ REPRODUCING APPARATUS

BACKGROUND OF THE INVENTION

1. Field of the Invention

The present invention relates to a digital voice recording/ reproducing apparatus (hereinafter called simply a "digital recorder").

2. Description of the Related Art

In a digital recorder having a voice memory section to which voice data is recorded, some measures have been made to keep confidentiality of information recorded in the voice memory.

For example, a method is known whereby a voice cartridge is attached to a main body, and a keyword is set when recording in order that the voice cannot be reproduced as long as the keyword is not designated. However, in this method, the keyword must be set every time when the recording is performed. Jpn. Pat. Appln. KOKAI Publication No. 63-90098 discloses a method in which the set keyword is stored in a storage circuit so that the keyword is set with one touch after the keyword is once set.

Moreover, a method is known in which a key number, which only a user knows, is set and voice data, as such, is encrypted in accordance to the key number.

However, in the above-mentioned method for keeping confidentiality by setting the keyword, there is a problem in that security cannot be ensured when the keyword is entrusted to a third person. Therefore, for providing an effective security function in which the voice cartridge can be used in only a specific digital recorder, a non-standardized product must be manufactured. As a result, problems are caused by the increase in the number of manufacturing processes, the increase in plant and equipment investment, and the complicated management of manufacture which is required, and the entire cost is increased.

The above-mentioned method for keeping confidentiality by setting the key number is a dedicated system between the users. Therefore, in a case where a normal message to a person, who has a standard type of digital voice recorder, is recorded, or a case when a soft tape for general people is reproduced, there is a problem in that the digital recorder cannot be used at all or there is difficulty in using the digital recorder, and a wide use cannot be performed.

SUMMARY OF THE INVENTION

An object of the present invention is to provide a digital voice recording/reproducing apparatus, which has a firm security function in which a voice cartridge can be used only with a specific digital recorder in accordance with a conventional standard, and which can perform the wide use even in an apparatus for keeping digital voice data confidential.

According to a first aspect of the present invention, there is provided a digital voice recording/reproducing apparatus comprising user identification code storing means, provided in a main body, for storing a predetermined user identification code in advance; voice cartridge attaching means for attaching a detachable voice cartridge having a semiconductor memory to the main body; and user identification code writing means for writing the user identification code stored in the main body in advance by the user identification code storing means to the semiconductor memory of the voice cartridge attached to the main body by the voice cartridge attaching means.

According to a second aspect of the present invention, there is provided a digital voice recording/reproducing apparatus comprising key number setting means for setting a key number for encryption; encrypting means for converting digital voice data to encryption data in accordance with the key number set by the key number setting means; a voice memory for recording the digital voice data encrypted by the encrypting means or digital voice data before being encrypted; decoding means for reading the digital voice data recorded on the voice memory to be decoded to normal digital voice data in accordance with the key number set by the key number setting means; and selecting means for selecting whether or not at least one of encryption processing by the encrypting means and decoding processing by the decoding means is executed.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view showing the structure of a digital recorder to which the present invention is applied;

FIG. 4 is a flow chart showing an operation of the first embodiment of the present invention;

FIG. 7 is a view showing the structure of the decoding section of a DES (Data Encryption Standard) system of FIG. 5;

FIG. 8 is a flow chart showing an operation at a recording time in the second embodiment of the present invention.

DETAILED DESCRIPTION OF THE PREFERRED EMBODIMENTS

Figures 2, 3:
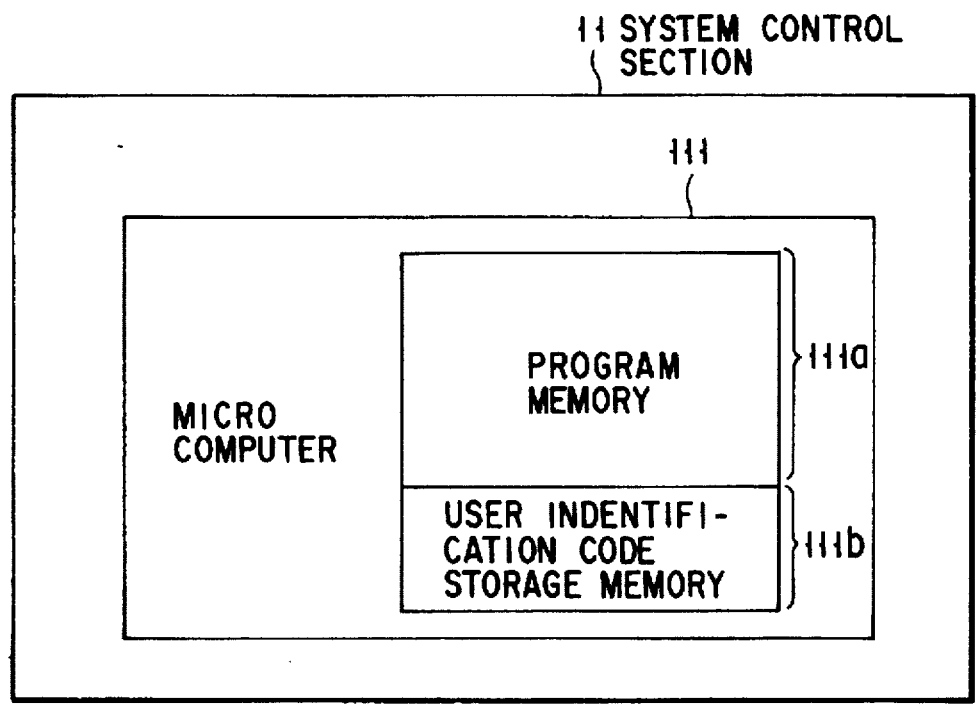
FIG. 2 is a view showing an internal structure of a system control section of a first embodiment of the present invention.
FIG. 3 is a view showing one example of a user identification code.

Embodiments will be explained with reference to the drawings.

FIG. 1 is a view showing the structure of a digital recorder to which the present invention is applied. In the figure, a microphone 1 is connected to a first terminal of an encryption/decryption section 7 through a microphone amplifier 2 and an A/D converter 3.

A speaker 4 is connected to a second terminal of the encryption/decryption section 7 through a power amplifier 5 and a D/A converter 6. A third terminal of the encryption/ decryption section 7 is connected to a memory control section 8.

Moreover, in order to control each section, a system control section 11 is connected to the encryption/decryption section 7, the memory control section 8, a display section 10, and an operation input section 12 having operation buttons for recording, reproducing, erasing, and a user identification code rewrite button as a user identification code writing means to be described later.

Also, in the main body of the digital recorder having the above-mentioned structure, a voice cartridge 9, having a semiconductor memory therein can be detachably provided. When the voice cartridge 9 is attached to the main body, the voice cartridge 9 is connected to the memory control section 8, and therefore voice information can be written/read to/from the semiconductor memory.

According to the above-mentioned structure, a voice supplied from the microphone 1 is amplified by the microphone amplifier 2, converted to digital data through the A/D converter 3, and a predetermined encryption is provided by the encryption/decryption section 7. Encrypted data is recorded in the detachable voice cartridge 9 under the control of the memory section 8.

At the time of reproducing the voice, among digital data recorded in the voice cartridge 9, data to be reproduced is decrypted by the encryption/decryption section 7 under the control of the memory control section 8. Decrypted data is returned to an analog signal by the D/A converter 6, amplified by the power amplifier 5, and outputted as a voice from the speaker 4. In this case, timing for, e.g., recording, reproducing, and stopping is controlled by the system control section 11 in response to a signal sent from the operation input section 12.

The system control section 11 of the first embodiment has a built-in microcomputer 111 for controlling the functions e.g. recording and reproducing as shown in FIG. 2. Microcomputer 111 includes a built-in program memory 111a in which a control program is stored and a user identification code storage memory 111b in which a user identification code (to be described later) is stored. Memories 111a and 111b comprise a E²PROM (Electrically Erasable Programmable ROM) as an electrically rewritable nonvolatile memory, so that writing, reading, and rewriting can be electrically performed.

FIG. 3 is a view showing one example of the above-mentioned user identification code. In this example, two bits are used. For example, "01" is allocated to a product A, "10" is allocated to a product B, and "11" is allocated to a product C. A special code "00" is allocated to show that the voice cartridge 9 is a widely used product or an unused product. In this embodiment, from the time of shipping the products at factory, the user identification code ("01" in the case of product A) is written to the user identification code storage memory 111b of the system control section 11, and the special code "00" showing an unused product is written to a final address position of the semiconductor memory of the voice cartridge 9.

The following will explain an operation of the system control system 11 after the voice cartridge 9 is attached to the main body by the user with reference to the flow chart of FIG. 4.

First, the voice cartridge 9 is attached to the main body (step S1). The system control section 11 reads the user identification code written in the final address position of the semiconductor memory of the voice cartridge 9 (step S2). Then, it is checked whether or not the user identification code ("01") written to the user identification code storage memory 111b of the main body coincides with the user identification code of the voice cartridge 9 (step S3). In this case, since the user identification code written in the final address position of the semiconductor memory of the voice cartridge 9 is "00", the code of the user identification code storage memory 111b is "01", the result of the check is NO.

Then, it is checked whether or not the user identification code of the voice cartridge 9 is "00" (step S4). Since the result of the check is YES, an indicator indicating whether the voice cartridge 9 is for dedicated use or wide use is displayed by the display section 10 (step S7). In this case, since the code "00" is written in the voice cartridge 9, the wide use is displayed. Thereby, there can be obtained a usable state, i.e., an operation input standby state (step S8). Then, it is checked whether or not an erase operation is performed (step S9). If the erase operation is performed, voice data is erased, and the user identification code of the voice cartridge 9 is rewritten to "00" (step S10). Since the voice cartridge 9 is designated as a wide use, the voice cartridge 9 can be attached to another digital recorder. In other words, if the user wants the voice cartridge 9 to be used as a wide use cartridge, the user only performs the erase operation. In this case, if unerased data is partially left, there is the possibility that data will be heard by the other person. Therefore, all data is preferably erased.

After executing step S10 or in the case that the erase operation is not performed, step S11 is immediately performed. In step S11, it is checked whether or not the user presses a user identification code rewrite button (not shown) of the operation input section 12. If the user presses the button, it is judged that the user intends to use the voice cartridge 9 as a dedicated use cartridge. Then, the user identification code "00" of the voice cartridge 9 is rewritten to the user identification code "01" of the main body, and the display showing that the voice cartridge 9 is the dedicated use cartridge is performed (steps 12 and 7).

On the other hand, in step S3, if the user identification code written to the user identification code storage memory 111b of the main body does not coincide with the user identification code of the voice cartridge 9 and the user identification code of the voice cartridge 9 is not "00", it is judged that the attached voice cartridge 9 is not usable in the digital decoder, and the display showing that the voice cartridge is unusable is performed by the display section 10 (steps 5 and 6).

As mentioned above, according to the above-mentioned embodiment, it is checked whether the user identification code of the voice cartridge 9 is a special code "00", a code stored in the main body ("01" in the case of product A), or another code, and display is performed by the display section 10 of FIG. 1 in accordance with the result of the check. In a case where the user identification code of the voice cartridge 9 is a predetermined special code "00", the recording and reproducing can be performed even if the user identification code of the voice cartridge 9 does not coincide with the user identification code stored in the main body. Moreover, it is possible to select whether the user identification code stored in the main body is written to the voice cartridge 9 or a predetermined special code "00" by operating the erase button of the operation input section 12 or the user identification code rewrite button.

As mentioned above, according to the digital voice recording/reproducing apparatus of the above embodiment, since the user does not know the identification code, the code is not leaked to the other person. Therefore, there can be provided an effective security function in which the voice cartridge can be used only in a specific recording/reproducing apparatus as the conventional standard is kept.

Moreover, since the recording/reproducing can be performed only when both the user identification codes are consistent with each other, a much more effective security function can be provided.

Also, since the user identification code is written onto the E²PROM mounted on the microcomputer 111, another product can be manufactured simply by rewriting the user identification code electrically. It is not necessary that the mask of the microcomputer itself be rewritten, and this is advantageous in view of manufacturing efficiency and cost. After the operation input standby state in step S7 of FIG. 4, the recording operation may be performed. Thus, it is possible to select whether the user identification code stored in the main body is written to the voice cartridge or whether the special code showing the wide use is written.

The following will explain the second embodiment.

Figure 5:
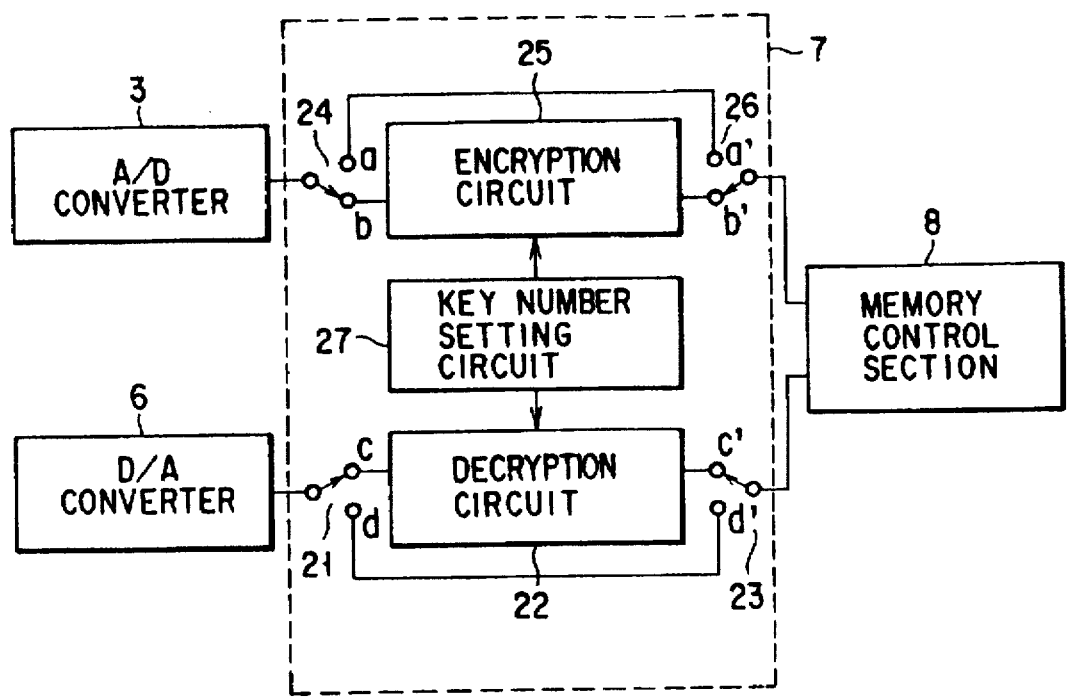
FIG. 5 is a view showing the structure of an encoding/ decoding section of a second embodiment.

FIG. 5 is a view showing the structure of the encryption/decryption section of the second embodiment.

In FIG. 5, an output of the A/D converter 3 is connected to a support of a switch 24, which is switchable between a point a and a point b. The point b of the switch 24 is connected to b' of a switch 26 through an encryption circuit 25 connected to a key number setting circuit 27. The point a of the switch 24 is directly connected to a point a' of the switch 26. A support of the switch 26 is connected to the memory control section 8.

An input of the D/A converter 6 is connected to a support of a switch 21, which is switchable between a point c and a point d. The point c of the switch 21 is connected to c' of a switch 23 through a decryption circuit 22 connected to the key number setting circuit 27. The point d of the switch 21 is directly connected to a point d' of the switch 23. A support of the switch 23 is connected to the memory control section 8.

The operation of each section of the encryption/decryption section is controlled by a control signal supplied from the system control section 11.

The other structure is the same as the first embodiment. However, the operation is performed in accordance with the second embodiment as described below.

Figure 6:
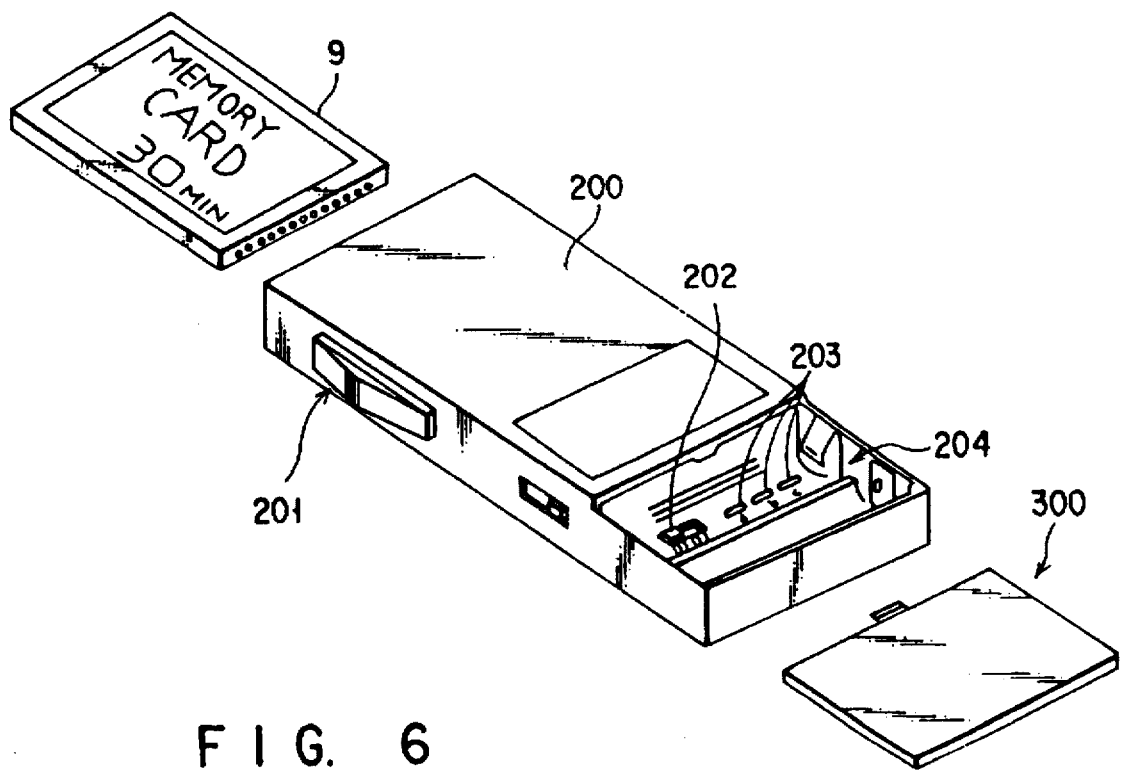
FIG. 6 is a perspective view of a back surface of a digital recorder of the second embodiment of the present invention.

FIG. 6 is a perspective of a back surface of a digital recorder of the second embodiment of the present invention. When the voice cartridge 9 is attached to a main body 200, the connection between the internal semiconductor memory section and the memory control section 8 is made. In this figure, reference numeral 201 is an operation button.

As shown in FIG. 6, in a battery chamber 204, there are provided an encryption mode switch 202 and key number setting buttons a, b, and c (203). The encryption mode switch 202 is used to select whether or not an operator performs encryption at the recording time. The key number setting buttons a, b, and c are used to set a key number, which is necessary for encryption. After the selection of the encryption mode and the setting of the key number, the battery chamber 204 is closed by a battery cover 300. Therefore, the encryption mode switch 202 and key number setting buttons a, b, and c (203) cannot be seen from the outside, so that confidentiality can be improved. The above-mentioned operation button 201, the encryption mode switch 202 and key number setting buttons a, b, and c (203) form the operation input section 12.

FIG. 7 is a view showing the structure of a DES (Data Encryption Standard) system in the encryption circuit 25 of FIG. 5. In this figure, an inverting section 51 to which digital voice data (64-bit plaintext data) is inputted from the A/D converter 3 is connected to first and second input terminals of a substitute section 52. Then, first and second output terminals of the substitute section 52 are connected to an inverting section 53.

Also, an inverting section 54 to which the 64-bit key number outputted from the key number setting circuit 27 is inputted is connected to first and second input terminals of a contract-transpose section 55, and an output of the contract-transpose section 55 is connected to a third input terminal of the substitute section 52.

The following will explain an outline of the operation of the above-structured encryption circuit 25.

First, the operator turns on the encryption mode switch 202, and sets the 64-bit key number by the key number setting button 203. 56 bits, which are obtained by reducing 8 bits of a check bit from 64 bits of the key number, are transposed in accordance with a rule, which is predetermined by the inverting section 54. Thereafter, the transposed 56 bits are divided into every 28 bits, and inputted to the the contract-transpose section 55. The contract-transpose section 55 executes a contract-transpose operation over 16 stages to generate 16 key numbers (k1 to k16), and the generated 16 key numbers are provided to the substitute section 52.

On the other hand, plaintext data, serving as digital data, which has not yet been encrypted, is blocked into every 64 bits, and inputted to the inverting section 51 of the encryption circuit 25. The inverting section 51 performs transposition to the plaintext data which has no connection with the key number. Transposed data is divided into every 32 bits and inputted to the substitute section 52. The substitute section 52 executes a substitute calculation over 16 stages based on transposed data and key numbers k1 to k16 to determine a function f (fk1 to fk16), and the transposed data is encoded. Then, substituted data from the substitute section 52 is transposed again by the inverting section 53 to output encoded 64-bit data.

Figure 9:
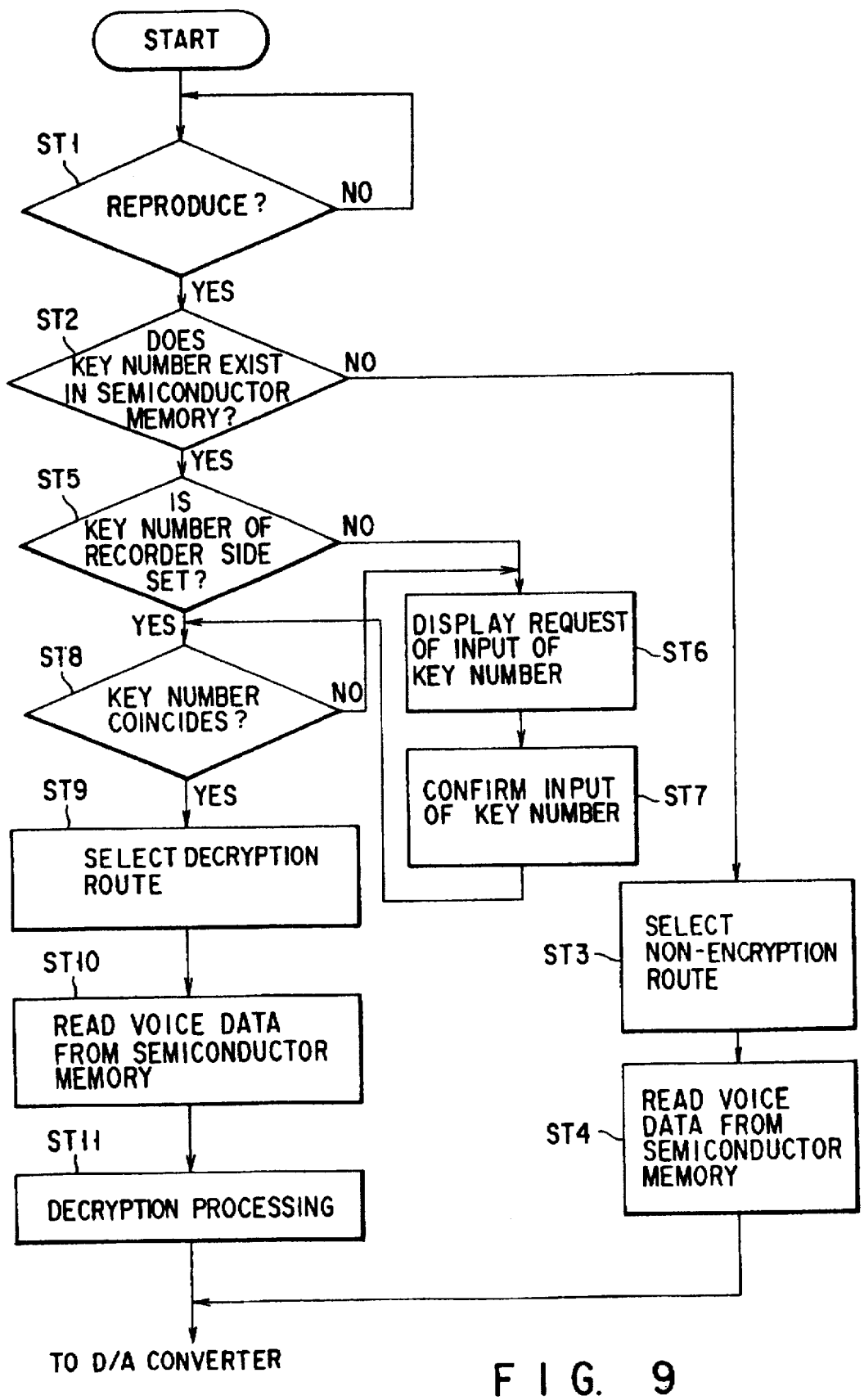
FIG. 9 is a flow chart showing an operation at a reproducing time in the second embodiment of the present invention.

The following will explain an operation of the second embodiment with reference to the flow charts of FIGS. 8 and 9. In the following explanation, marks SM and ST show steps.

First, an operation at the recording time will be explained with reference to FIG. 8. In this case, the system control section 11 waits until an operation button 201 of the operation input section 12 is operated to designate the recording (step SM1). When the recording is designated, it is confirmed whether an encryption mode switch 202 of the operation section 12 is ON or OFF (step SM2). At this time, if the encryption mode switch 202 is OFF, the system control section 11 selects a non-encryption route in SM3, that is, the switch 24 of FIG. 5 is switched to the point a, and the switch 26 is switched to the point a' to perform the normal recording processing.

In this case, an analog voice signal, which is inputted from the microphone 1 and amplified by a microphone amplifier 2, is digitized by the A/D converter 3. Then, digitized voice data is directly written to the semiconductor memory of the voice cartridge 9 through the memory control section 8 without being encrypted (step SM10).

On other other hand, if the encryption mode switch 202 is ON, it is confirmed whether or not the key number for encryption is already set by the key number setting button 203 (step SM4). If the button is already set, an encryption route is selected (step SM7). In other words, the switch 24 of FIG. 5 is switched to the point b, and the switch 26 is switched to the point b. Then, in SM8, digital voice data is encrypted by the encryption circuit 25. Thereafter, the key number is written to the semiconductor memory of the voice cartridge 9 and digital voice data is also written thereto at the same time (steps SM9, SM10).

If the key number is not set in step SM4, the display requesting the input of the key to the user is performed by the display section 10 (step SM5). Then, it is confirmed that the key number is inputted in SM6. Thereafter, the above-mentioned steps SM7 to SM10 are executed.

Next, an operation at the reproducing time will be explained with reference to FIG. 9. In this case, the system control section 11 waits until an operation button 201 of the operation input section 12 is operated to designate the reproducing (step ST1). When the reproducing is designated, data of the key number section is read from the semiconductor memory of the voice cartridge 9 through the memory control section 8 to confirm whether or not the key number exists (ST2). If the key number does not exist in the semiconductor memory, data is judged as digital voice data which has not been encrypted, and the non-decoding route is automatically selected (step ST3). In other words, the switch 21 is switched to the point d, and the switch 23 is switched to point d'. In this case, in step ST4, digital voice data is read from the semiconductor memory. Thereafter, read digital voice data is supplied to the D/A converter 6 through the memory control section 8 without being decoded.

On the other hand, if the key number exists, it is judged that digital voice data recorded in the semiconductor memory is data which has been encrypted, and it is confirmed whether or not the key number of the recorder is set by the key number setting button 203 (step ST5). In this case, if the key number of the recorder is set, it is checked whether or not the key number recorded in the semiconductor memory coincides with the key number of the recorder (step ST8). When they coincide with each other, the switch 21 is switched to the point c, and the switch 23 is switched to the point c', whereby the decoding route is selected (ST9).

In this case, digital voice data is read from the semiconductor memory through the memory control section 11 in step ST10, and decoded by the decoding circuit 22 to be supplied to the D/A converter 6 in step ST11.

In a case where the key number of the recorder is not set even if the key number exists in the semiconductor memory of the voice cartridge 9, or the key number of the recorder does not coincide with the key number of the semiconductor memory even if the key number of the recorder is set, the display requesting the input of the key to the user is performed by the display section 10 (step ST6). Then, it is confirmed that the key number is inputted in step ST7. Thereafter, the routine (step 8) for checking whether or not the key number recorded in the semiconductor memory coincides with the key number of the recorder is performed again.

As mentioned above, according to the embodiments of the present invention, since the user can select the encryption processing and the decoding processing, the apparatus can be widely used even if the use of the apparatus aims to maintain the confidentiality of digital voice data. For example, in the case where confidentiality of data is not needed at the recording time or a person, who intends to reproduce the recorded voice, is an owner of a standard recorder having no encryption function, the operator turns off the encryption mode switch 202 such that the encryption is not performed. Therefore, even if the user of the apparatus aims to keep confidentiality, the apparatus can be used as a wide use.

The selection of whether or not the encryption is performed and the setting of the key number can be executed by the switches, which are provided in the battery chamber 204 for supplying power of the apparatus, that is, by the operation of the encryption mode switches 202 and key number setting button 203. Therefore, confidentiality can be improved. Moreover, since the switches are provided in the battery chamber, the switches can be prevented from being easily operated from the outside.

Furthermore, the selection of the decoding processing can be automatically performed, depending on whether or not the key number for encryption is recorded in the semiconductor memory. Due to this, the use of the apparatus becomes easier.

In the above-mentioned embodiments, the voice cartridge in which the semiconductor memory is provided was structured to be detachable from the digital voice recording/ reproducing apparatus. However, the semiconductor memory may be built into the main body of the apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A digital voice recording or reproducing apparatus comprising:

key number setting means for setting a key number for encryption;

encrypting means for converting digital voice data to encryption data in accordance with said key number set by said key number setting means;

a voice memory for recording one of encrypted digital voice data and unencrypted digital voice data;

decrypting means for decrypting said encrypted data recorded in said voice memory in accordance with said key number set by said key number setting means; and selecting means for selecting whether or not encryption processing by said encrypting means and decrypting processing by said decrypting means are executed.

2. The apparatus according to claim 1, wherein at least one of a selecting operation by said selecting means and a setting of said key number by said key number setting means is executed by operating switches provided in a battery chamber for supplying power to the apparatus.

3. The apparatus according to claim 1, wherein a selection of the decrypting processing is automatically performed, when said key number is stored in the voice memory.

4. A digital voice recording and reproducing apparatus comprising:

user identification code storage means, provided in a main body, for storing in advance a predetermined user identification code, said predetermined user identification code being used to maintain confidentiality of digital voice data and being uniquely assigned to the digital voice recording and reproducing apparatus without being disclosed to a user of the apparatus;

voice cartridge attaching means for attaching a detachable voice cartridge having a semiconductor memory to said main body;

user identification code writing means for writing said predetermined user identification code stored in said user identification code storage means to said semiconductor memory of said detachable voice cartridge when said predetermined user identification code has not been previously written in said semiconductor memory of said detachable voice cartridge;

a source of voice signals;

an A/D converter for converting said voice signals into digital voice data;

key number setting means for setting a key number for encryption;

encrypting means for converting said digital voice data to encryption data in accordance with said key number set by said key number setting means;

control means for causing said semiconductor memory of said voice cartridge to record at least one of said encrypted digital voice data and unencrypted digital voice data;

decrypting means for decrypting said encrypted data recorded in said voice memory in accordance with said key number set by said key number setting means; and selecting means for selecting whether or not encryption processing by said encrypting means and decrypting processing by said decrypting means are executed.

5. The apparatus according to claim 4, wherein at least one of a selecting operation by said selecting means and a setting of said key number by said key number setting means is executed by operating switches provided in a battery chamber for supplying power to the apparatus.

6. The apparatus according to claim 4, wherein a selection of the decryption processing by said selecting means is automatically performed, depending on whether or not a key number for encryption by said encrypting means is recorded in said semiconductor memory.

7. A digital voice recording and reproducing apparatus comprising:

user identification code storage means, provided in a main body, for storing in advance a predetermined user identification code, said predetermined user identification code being used to maintain confidentiality of digital voice data and being uniquely assigned to the digital voice recording and reproducing apparatus without being disclosed to a user of the apparatus;

voice cartridge attaching means for attaching a detachable voice cartridge having a semiconductor memory to said main body, said semiconductor memory recording the predetermined user identification code from the user identification code storage means when an operation input is provided to said digital voice recording and reproducing apparatus;

user identification code comparing means for comparing said user identification code stored in said user identification code storage means with said user identification code recorded in said semiconductor memory of said voice cartridge, after said detachable voice cartridge is attached to said main body by said voice cartridge attaching means; and controlling means for providing the operation input to said digital voice recording and reproducing apparatus based on a comparison result obtained by said user identification code comparing means;

a source of voice signals;

an A/D converter for converting said voice signals into digital voice data;

key number setting means for setting a key number for encryption;

encrypting means for converting said digital voice data to encryption data in accordance with said key number set by said key number setting means;

control means for causing said semiconductor memory of said voice cartridge to record at least one of said encrypted digital voice data and unencrypted digital voice data;

decrypting means for decrypting said encrypted data recorded in said voice memory in accordance with said key number set by said key number setting means; and selecting means for selecting whether or not encryption processing by said encrypting means and decrypting processing by said decrypting means are executed.

8. The apparatus according to claim 7, wherein at least one of a selecting operation by said selecting means and a setting of said key number by said key number setting means is executed by operating switches provided in a battery chamber for supplying power to the apparatus.

9. The apparatus according to claim 7, wherein a selection of the decryption processing by said selecting means is automatically performed, depending on whether or not a key number for encryption by said encrypting means is recorded in said semiconductor memory.

* * * * *